United States Patent [19]

Yamada

[11] Patent Number: 5,105,450

[45] Date of Patent: Apr. 14, 1992

[54] CHARGE TRANSFER DEVICE HAVING ALTERNATING LARGE AND SMALL TRANSFER ELECTRODES

[75] Inventor: Tetsuo Yamada, Yokohama, Japan

[73] Assignee: Kabushiki Kaisha Toshiba, Kawasaki, Japan

[21] Appl. No.: 744,663

[22] Filed: Aug. 9, 1991

Related U.S. Application Data

[63] Continuation of Ser. No. 551,414, Jul. 12, 1990, abandoned.

[30] Foreign Application Priority Data

Jul. 12, 1989 [JP] Japan .................. 1-179813

[51] Int. Cl.$^5$ .................. G11C 19/28; H01L 29/78; H04N 3/14; H01L 27/14
[52] U.S. Cl. .................. 377/58; 357/24; 357/30; 358/213.26; 358/213.29; 358/213.31
[58] Field of Search ............... 357/24, 30; 377/57-63; 358/213.26, 213.29, 213.31

[56] References Cited

U.S. PATENT DOCUMENTS

| 4,178,614 | 12/1979 | Sauer | 357/24 LR |
| 4,868,855 | 9/1989 | Boudewijns et al. | 357/24 LR |
| 4,903,284 | 2/1990 | Esser | 357/24 LR |

FOREIGN PATENT DOCUMENTS 159785  10/1985  European Pat. Off. ....... 357/24 LR

OTHER PUBLICATIONS

Theuwissen et al., "The Accordion Imager: an Ultra High Density Frame Transfer CCD", IEEE Int. Electron Devices Meeting (12/84), Dig. Tech. Papers, pp. 40-43.

*Primary Examiner*—Gene M. Munson
*Attorney, Agent, or Firm*—Foley & Lardner

[57] ABSTRACT

There is provided a charge transfer device comprising a shift register comprised of a plurality of shift stages directly connected to each other, phase pulses for a multi-phase control pulse being delivered to the shift stages, respectively, a transfer control pulse being delivered to the shift register stage arranged at one end of the plurality of shift stages; and a transfer unit having a plurality of transfer electrodes provided in correspondence with the shift stages of the shift register, transfer pulses being delivered from the shift stages of the shift register to the transfer electrodes, respectively, to apply transfer pulses in a predetermined order from the shift stages of the shift register to the transfer electrodes of the transfer unit, respectively, to thereby sequentially transfer signal charges stored below the transfer electrodes in a predetermined direction. In this device, the transfer electrodes are such that transfer electrodes having a large electrode area and transfer electrodes having a small electrode area are arranged one after other, and that they are connected to the respective stages of the shift register in order. It is desirable that the area relationship of the transfer electrodes is such that the ratio between transfer electrodes having a large electrode area and a small electrode area is set to a sufficiently large value. This charge transfer device is combined with a photoelectric conversion unit comprised of a plurality of photosensitive elements to constitute a solid state image pickup device.

15 Claims, 9 Drawing Sheets

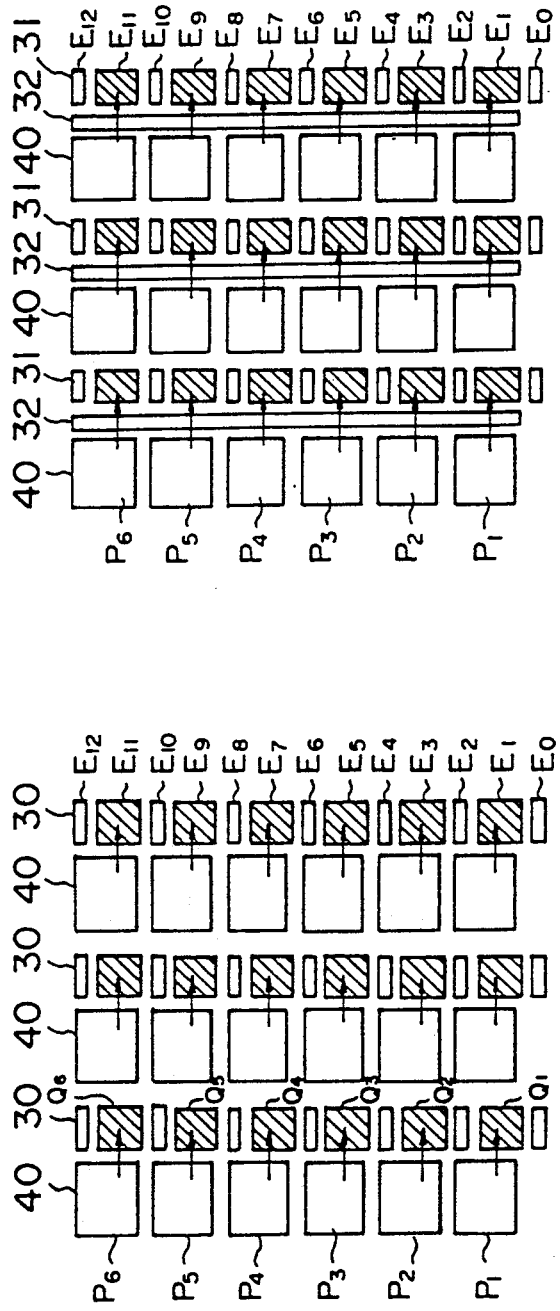
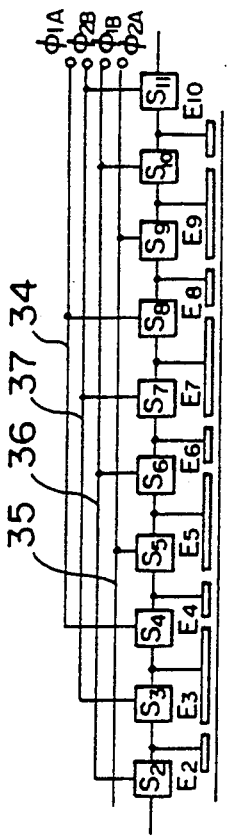
FIG.3
FIG.2
FIG.4

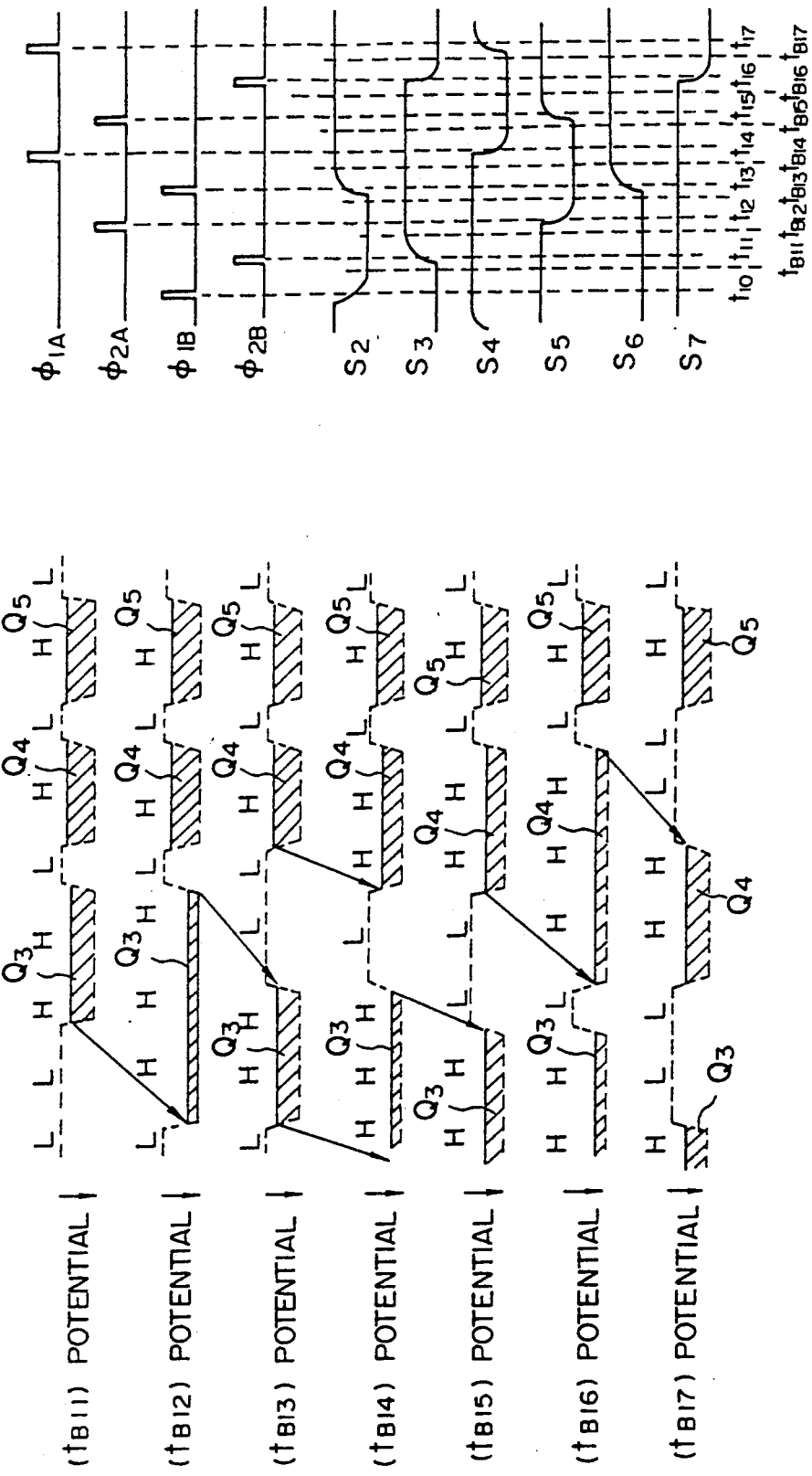

CHARGE TRANSFER DEVICE HAVING ALTERNATING LARGE AND SMALL TRANSFER ELECTRODES

This application is a continuation of application Ser. No. 07/551,414, filed July 12, 1990, now abandoned.

BACKGROUND OF THE INVENTION

This invention relates to a charge transfer device and a solid state image pickup device using a charge transfer device.

Heretofore, a solid state image pickup device called an accordion imager has been known. This device is described in detail on pages 40 to 43 in the Technical Digest at the International Electron Device Meeting in 1984. A conventional accordion imager is shown in FIG. 20. This imager includes six charge transfer devices 1 arranged in parallel, 20 transfer electrodes 2, per each charge transfer device constituting respective transfer devices, a shift register 3, two-phase control pulse supply lines 4 and 5 for controlling the shift operation of the shift register, and transfer pulse supply lines 6 for delivering outputs from the shift stages as transfer pulses to corresponding transfer electrodes, respectively. Each charge transfer device 1 functions as photoelectric conversion elements to store or accumulate, for a predetermined time, carriers generated by light incident to the transfer channel through the electrodes 2 and transfer them.

This operation will be described in detail in conjunction with FIG. 21. In FIG. 21(a), reference symbols $S_1$ to $S_{12}$ represent respective shift stages, reference numeral 7 an input terminal for inputting a transfer control pulse to the shift register, and reference symbols $E_0$ to $E_{11}$ respective transfer electrodes when one of a plurality of charge transfer devices is taken out. Further, the slanting line portions represent the state where signal charges are stored below the transfer electrodes (the electrode voltage corresponds to high level which will be referred to as H level hereinafter, respectively, and non-slanting line portions represent the state no signal charge is stored below the transfer electrodes (the electrode voltage corresponds to low level which will be referred to as L level), respectively. In addition, reference symbols $A_1$ to $A_{15}$ represent transfer states at respective times after the transfer operation is initiated. Reference symbols $\Phi_1$ and $\Phi_2$ denote shift register control pulses of first and second phases, respectively. Such a two-phase clock pulse is conventionally used. Reference symbol PI denotes a transfer control pulse inputted to the shift register. As shown in FIG. 22, each of shift stages $S_1$ to $S_{12}$ comprises a sample hold circuit comprised of a MOS transistor 11a and a capacitor 11b, and an inverter 12. When a pulse of L level is inputted as the transfer control pulse PI, a signal of H level is outputted. Namely, a signal is inverted every time it is shifted by one stage and the inverted signal is transmitted to the succeeding stages. Accordingly, when the shift register continues to be operated under the state where the transfer control pulse PI is held at L level, the transfer state of $A_1$ lasts, so H level is held every other electrode. In this state, where carriers produce by photo conversion are stored, one pixel is formed by two electrodes in a vertical direction. In the example of FIG. 21, six pixels are formed. After storage operation for a predetermined time is completed, when the transfer control pulse PI shifts to H level, the electrode $E_0$ is placed at H level. As a result, signal charge $Q_1$ moves to the portion below two electrodes extending from $E_1$ to $E_0$, resulting in the state of $A_2$.

When a control pulse $\Phi_2$ is applied at time $t_3$, the shift stage $S_1$ becomes operative. As a result, a transfer control pulse PI of H level is inverted and that inverted pulse is transmitted to the electrode $E_1$. Thus, the electrode $E_1$ is placed at L-level, so signal charge $Q_1$ moves from the electrode $E_1$ to $E_0$, and predetermined other devices succeeding thereto (e.g., a horizontal transfer device) (state of $A_3$). When the transfer control pulse PI shifts to L level, the electrode $E_0$ is placed at L level. When the control pulse $\Phi_1$ applied at time $t_4$, L level of the electrode $E_1$ moves to the electrode $E_2$ as H level inverted by the shift stage $S_2$, resulting in the state of $A_4$. The signal charge $Q_1$ has completed transfer from the transfer device 1 to other devices, and a portion of the signal charge $Q_2$ moves to the portion below the electrode $E_2$. Subsequently, when the control pulse $\Phi_2$ is applied, potential levels of the shift stages $S_1$ and $S_3$ are inverted, resulting in the state of $A_5$. As a result, signal charge $Q_1$ moves to the portion below the electrodes $E_1$ and $E_2$. At this time, the electrode $E_3$ is placed at L level. Thus, transfer of signal charges $Q_1$ from the electrode $E_3$ is completed.

Subsequently, when the transfer control pulse PI shifts to H level and the control pulse $\Phi_1$ is applied at time $t_6$, there results the state of $A_6$. Namely, the electrode $E_4$ is placed at H level by the level inversion of the shift stage $S_4$. As a result, signal charge $Q_3$ moves to the portions below the electrodes $E_4$ and $E_5$, and signal charge $Q_2$ moves to the portions below the electrodes $E_0$ and $E_1$ by the level inversion of the shift stage $S_2$ by the transfer control pulse PI.

When the control pulse $\Phi_2$ is applied at time $t_7$, there occur level inversions of the shift stages $S_1$, $S_3$ and $S_5$, resulting in the state of $A_7$. Subsequently, when the transfer control pulse PI shifts to L level and the control pulse $\Phi_1$ is applied at time $t_8$, levels of the shift stages $S_2$, $S_4$ and $S_6$ are inverted, resulting in the state of $A_8$. Thus, signal charge $Q_2$ has been completely transferred from the transfer device to other devices. By repeating such an operation, signal charges $Q_3$, $Q_4$, $Q_5$ and $Q_6$ are transferred. Thus, all signal charges can be transferred to other devices.

This charge transfer process in this prior art is similar to the transfer process of a well known four-phase driven charge transfer device constructed to store charges below two electrodes and transfer them. However, this prior art differs from the four-phase driven charge transfer device in the following ways. First, in the case of the four-phase driven charge transfer device, since a common transfer pulse is applied every four electrodes, it is unable to independently transfer signal charges stored below every other electrode by a four-phase drive in sequence. Namely, since a pixel must be formed using four electrodes as one set, only three pixels are formed in a vertical direction in the case of the number of electrodes of FIG. 21. Accordingly, the degree of integration of pixels is one half of that of the above-mentioned prior art. Secondly, since phases of four pulses can be arbitrarily set in general in the case of the four-phase driven charge transfer device, a four-phase type maximum transfer charge quantity available in principle can be transferred.

On the other hand, in the case of the conventional accordion type charge transfer device, it is impossible to arbitrarily set inversion timings of H level and L level, inverted at every other electrode. Thus, the transfer ability of the four-phase type cannot be necessarily utilized.

This will be described with reference to FIGS. 23, 24 and 25.

FIG. 23 shows electrodes $E_2$ to $E_{10}$ connected to output stages $S_2, \ldots S_{10}$ of the shift register, respectively, and FIG. 24 shows a potential distribution in charge transfer channels below corresponding electrodes. As shown in FIG. 21, at time $t_6$, electrodes $E_2$ and $E_3$ are placed at L level, electrodes $E_4$ and $E_5$ are placed at H level, and electrodes $E_6$, $E_7$, $E_8$, $E_9$, $E_{10}$ are set so that they are at L level and H level one after another. In accordance with this, potentials of L level and H level of the transfer channel are formed as shown in FIG. 24 ($t_6$) Thus, signal charges $Q_3$, $Q_4$ and $Q_5$ are stored into the portions of H level. Since a maximum quantity of charges which can be stored and transferred prescribes the upper limit of the dynamic range, it is preferable that such a quantity is as large as possible. Further, since a quantity of charges which can be stored is substantially proportional to the electrode area, it is preferable that the charge storage state, i.e., the areas of the electrodes $E_1$, $E_3$, $E_5$, $E_7$, $E_9$ and $E_{11}$ set to H level before time $t_2$ are set to a relatively large value.

In the case where such a setting is made, at time $t_7$, if the electrode $E_3$ is first inverted to H level and the electrode $E_5$ is then inverted to L level, the merit of the four-phase drive can be utilized, resulting in no problem. However, the above-mentioned two operations are carried out at the same time in principle in the prior art. Let now consider the case where the rise time $t_r$ of the circuit constituting respective output stages of the shift register is large and the fall time $t_f$ thereof is small. The transfer pulse waveforms of respective output stages in this case is shown in FIG. 25. At time $t_7$, the output of the shift stage $S_5$ is already inverted to L level, but the output of the shift stage $S_3$ is not yet inverted to H level. Accordingly, as shown in FIG. 24 ($t_7$), the electrodes $E_3$ and $E_5$ adjacent to the electrode $E_4$ having a small area are placed at L level. At this time, signal charge $Q_3$ of which quantity is larger than a quantity of charges which can be stored only below the electrode $E_4$ overflows below the electrode $E_4$ and diffuses into the portion below electrodes of H level close thereto. $\Delta Q_3$ shown in FIG. 24 ($t_8$) shows a portion of signal charge $Q_3$ which overflows up to the electrode $E_7$ and is mixed with signal charge $Q_4$. Such a phenomenon will occur with respect to signal charge $Q_4$ at time $t_{10}$ shown in FIG. 24 ($t_{10}$), and will occur eventually with respect to all charges. In other words, in the case of the conventional accordion type charge transfer device, where a relative difference between the electrode areas is provided as shown in FIG. 23, the ability of the charge transfer device would be lowered. Accordingly, equally setting the areas of all the electrode results in a best structure. Namely, a maximum quantity of transfer charges cannot be larger than one half of that corresponding to all the area of the two electrodes. It has been described that the rise time $t_r$ of the output stage of the shift register and the fall time $t_f$ thereof are assumed to be expressed as $t_r > t_f$. However, generally in the case Of a complementary MOS inverter circuit (see FIG. 13) used at the output stage, a p-type channel transistor prescribing the rise time has a mobility smaller than that of an n-channel transistor prescribing the fall time. Ordinarily, the relationship expressed as $t_r > t_f$ holds. In addition, when the fact that it is very difficult to conduct a waveform control because of large unevenness of a load capacity of the electrodes and unevenness of the resistance over the entire transfer device is taken into consideration, it is difficult to realize an ideal four-phase drive using the conventional accordion type charge transfer device.

SUMMARY OF THE INVENTION

This invention has been made in view of the above-described problems, and its object is to provide a charge transfer device and a solid state image pickup device which permits the maximum storage and transfer charge quantity to be large as far as possible.

To achieve this object, in accordance with the first aspect of this invention, there is provided a charge transfer device comprising a shift register comprised of a plurality of shift stages directly connected to each other, phase pulses for a multi-phase control pulse being delivered to the shift stages, respectively, a transfer control pulse being delivered to the shift register stage arranged to one end of the plurality of shift stages, and a transfer unit having a plurality of transfer electrodes provided in correspondence with the shift stages of the shift register, transfer pulses being delivered from the shift stages of the shift register to the transfer electrodes, respectively, to apply transfer pulses in a predetermined order from the shift stages of the shift register to the transfer electrodes of the transfer unit, respectively, to thereby sequentially transfer signal charges stored below the transfer electrodes in a predetermined direction, characterized in that the transfer electrodes are such that transfer electrodes having a large electrode area and transfer electrodes having a small electrode area are arranged one after another, and that they are connected to the respective stages of the shift register in order.

Further, in accordance with the second aspect of this invention, there is provided a solid state image pickup device comprising a photoelectric conversion unit comprised of a plurality of photosensitive elements to convert an optical input to signal charges, a transfer unit having a plurality of transfer electrodes, transfer electrodes having a large electrode area and transfer electrodes having a small electrodes being arranged one after another, the transfer electrode area being connected to respective photosensitive elements in the photoelectric conversion unit in order to store signal charges from respective photosensitive elements to transfer storage charges when transfer pulses are applied thereto, and a shift register comprised of shift stages of which number corresponds to that of the transfer electrodes of the transfer unit, phase pulses for a multi-phase control pulse being delivered to the shift stages, respectively, a transfer control pulse being delivered to the shift register stage arranged at one end of the plural shift stages, the transfer pulses being delivered to the transfer electrodes, respectively.

BRIEF DESCRIPTION OF THE DRAWINGS

In the accompanying drawings:

FIG. 2 is a partial plan view showing a first embodiment of a solid state image pickup device according to this invention, FIG. 3 is a partial plan view showing a second embodiment of a solid state image pickup device according to this invention, FIG. 4 is a view showing an arrangement of a charge transfer device according to this invention, FIG. 5 is an explanatory view showing a charge transfer process of the charge transfer device shown in FIG. 4, FIG. 6 is a timing chart showing transfer pulses applied to the charge transfer device shown in FIG. 4.

DESCRIPTION OF PREFERRED EMBODIMENTS

Figure 1:
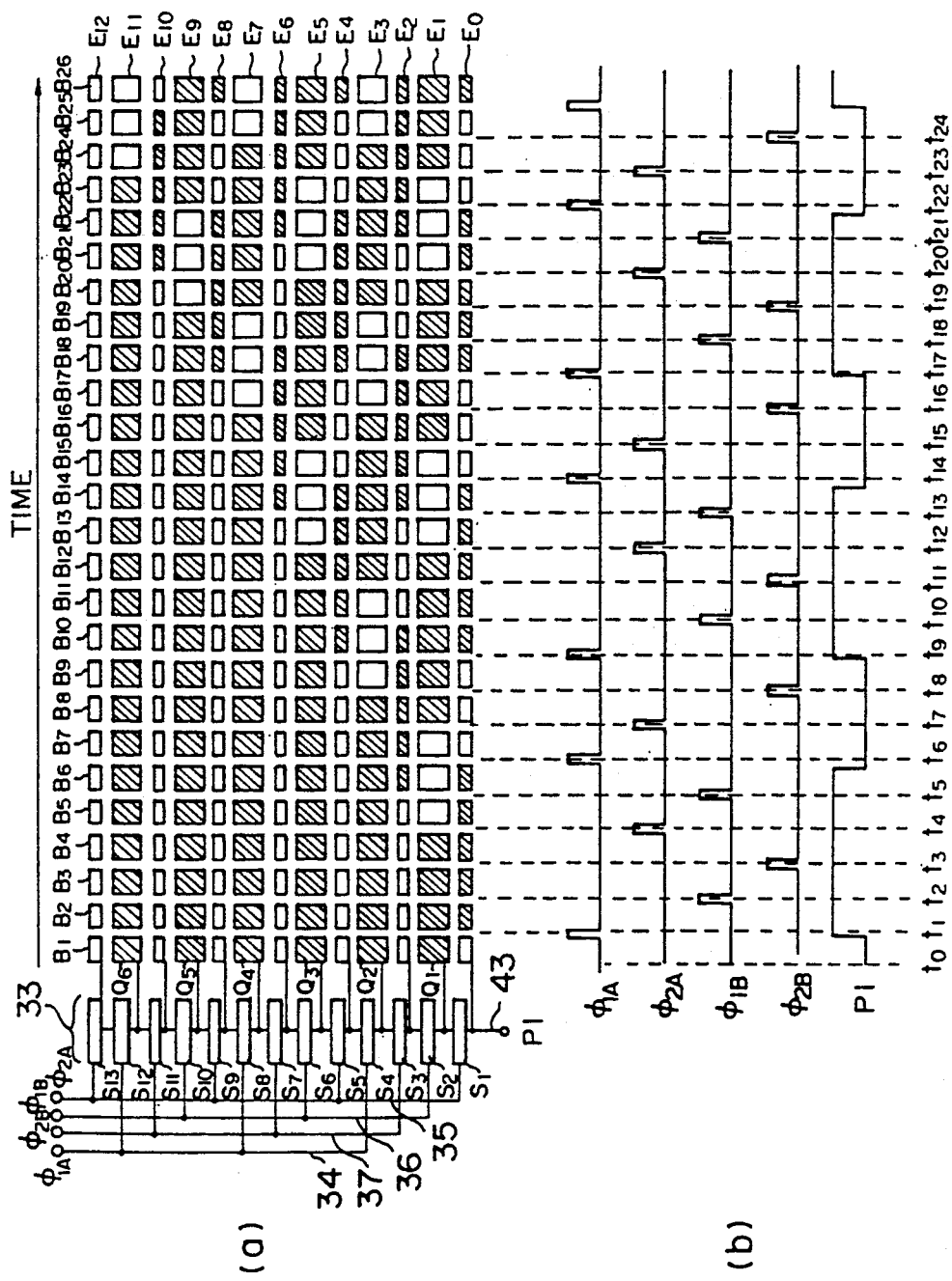
FIG. 1 is a view for explaining the principle of the operation of the transfer of signal charges in a solid state image pickup device according to this invention.

Preferred embodiments of this invention will now be described with reference to the attached drawings. FIG. 2 is a partial plan view showing a first embodiment of a solid state image pickup device according to this invention. In FIG. 2, reference numeral 40 represents photosensitive element trains each comprised of photosensitive elements $P_1 \ldots P_6$, and reference numeral 30 represents charge transfer devices each comprised of transfer electrodes $E_0$ to $E_{12}$. The transfer electrodes $E_1$, $E_3$, $E_5$, $E_7$, $E_9$ and $E_{11}$ also serve as electrodes for reading out charges from respective photosensitive element $P_i$ ($i=1, \ldots 6$). By simultaneously applying readout pulses which will be described later to these electrodes, signal charges are read out from the respective photosensitive elements. In this figure, reference symbols $Q_1$, $Q_2$, $Q_3$, $Q_4$, and $Q_5$ represent signal charges which have been read out. In this case, the electrode areas of the electrodes $E_1$, $E_3$, $E_5$, $E_7$, $E_9$ and $E_{11}$ are set so that they are sufficiently larger than those of the electrodes $E_2$, $E_4$, $E_6$, $E_8$, $E_{10}$ and $E_{12}$. Thus, this electrode structure function to read out a quantity of charges as large as possible and store them.

The principle of the transfer operation of the above-described first embodiment will be described with reference to FIG. 1. Reference numeral 33 represents a shift register, and reference symbols $S_1$ to $S_{13}$ represent the first to the thirteenth shift stages, respectively. Reference numeral 34 represents a supply line for a first shift control pulse $\Phi_{1A}$, and reference numerals 35, 36 and 37 represent supply lines for the second, third, and fourth shift control pulses $\Phi_{2A}$, $\Phi_{1B}$, and $\Phi_{2B}$, respectively. In addition, reference symbols $B_1$ to $B_{26}$ show the states at respective times of a distribution (H and L levels of the electrodes) of signal charges below the electrodes $E_0$ to $E_{12}$, respectively. Reference symbol $B_1$ shows the state where signal charges have been read out from the photosensitive elements.

When a transfer control pulse PI inputted to the input terminal 43 shifts to H level at time $t_1$, signal charges $Q_1$ are stored below the electrodes $E_0$ and $E_1$, resulting in the state of $B_2$. This state is unchanged until time $t_4$ when a control pulse $\Phi_{2A}$ for allowing the shift stage $S_1$ to be operative is applied at the subsequent time. When the control pulse $\Phi_{2A}$ is applied at the time $t_4$, the state of the shift stage $S_1$ is inverted. As a result, signal charge $Q_1$ moves from the electrode $E_1$ to initiate transfer to other transfer means. When a control pulse $\Phi_{1B}$ is delivered at time $t_5$, the state of the shift stage $S_2$ is inverted. As a result, the output level of the shift stage $S_2$ shifts to H level, so a portion of the signal charge $Q_2$ moves from the portion below the electrode $E_3$ to the portion below the electrode $E_2$. Then, the transfer control pulse PI shifts to L level. At time $t_6$, transfer of signal charge $Q_1$ from the electrode $E_0$ to other means is entirely completed.

At time $t_7$, the control pulse $\Phi_{2A}$ is delivered, so signal charge $Q_2$ is stored into the portion extending over three electrodes $E_1$, $E_2$ and $E_3$ (state of $B_8$). When a control pulse $\Phi_{2B}$ is delivered at time $t_8$, the state of the shift stage $S_3$ is inverted, and the electrode $E_3$ is placed at L level. As a result, signal charge $Q_3$ move so that they are stored only into the portions below the electrodes $E_1$ and $E_2$ (state of $B_9$). When a control pulse $\Phi_{1A}$ is delivered at time $t_9$, the state of the shift stage $S_4$ is inverted, so a portion of the signal charge $Q_3$ moves to the portion below the electrode $E_4$. At this time, the transfer control pulse PI also shifts to H level, so signal charge $Q_2$ is stored into the portions below the three electrodes $E_0$, $E_1$ and $E_2$ (state of $B_{10}$) When a control pulse $\Phi_{1B}$ is applied at time $t_{10}$, the state of the shift stage $S_2$ is inverted, so signal charge $Q_2$ is stored only into the portions below $E_0$ and $E_1$ (state of $B_{11}$). When a control pulse $\Phi_{2B}$ is delivered at time $t_{11}$, the state of the shift stage $S_3$ is inverted, so the electrode $E_3$ is placed at H level. Accordingly, signal charge $Q_3$ is stored into the portions below three electrodes $E_3$, $E_4$ and $E_5$, resulting in the state of $B_{12}$.

At time $t_{12}$, a control pulse $\Phi_{2A}$ is delivered, so the states of the shift stages $S_1$ and $S_5$ are inverted. Thus, the electrode $E_5$ is placed at L level, so signal charge $Q_3$ moves to only the portions below the electrodes $E_3$ and $E_4$ and are stored thereinto (state of $B_{13}$). Since the electrode $E_1$ is also placed at L level at this time, transfer of signal charge $Q_2$ to other devices is initiated. Similarly, when a control pulse $\Phi_{1B}$ is delivered at time $t_{13}$, the states of the shift stages $S_2$ and $S_6$ are inverted, so the electrodes $E_2$ and $E_6$ are placed at H level. Thus, portions of signal charges $Q_3$ and $Q_4$ move to the portions below the electrodes $E_2$ and $E_6$, respectively (state of $B_{14}$).

Then, the transfer control pulse PI shifts to L level and signal charge $Q_2$ is completely transferred. At time $t_{14}$, the shift stage $S_4$ is inverted by the control pulse 101 $1_A$, resulting in the state of $B_{15}$. At time $t_{15}$, a control pulse $\Phi_{2A}$ is delivered, so the shift stages $S_1$ and $S_5$ are inverted. Thus, signal charges $Q_3$ and $Q_4$ are stored into the portions below three electrodes $E_1$, $E_2$ and $E_3$ and the portions below three electrodes $E_5$, $E_6$ and $E_7$, respectively (state of $B_{15}$). Further, when a control pulse $\Phi_{2B}$ is delivered at time $t_{16}$, the states of the shift stages $S_3$ and $S_7$ are inverted. As a result, signal charges $Q_3$ and $Q_4$ move to portions below two electrodes $E_1$ and $E_2$ and the portions below two electrodes $E_5$ and $E_6$. By repeatedly carrying out the above-mentioned operation, transfer of signal charges $Q_3$, $Q_4$, $Q_5$ and $Q_6$ to other devices can be completed.

The feature of the above-described first embodiment resides in that, in transferring one signal charge, an approach is employed to once store it into the portion below the three electrodes thereafter to store it into the portion below the two electrodes. With the prior art, as previously described, such a control cannot be performed, with the result that there may occur the case where a signal charge is once stored into the portion below one electrode and is then stored into the portions below two electrodes. Accordingly, it is impossible to enlarge an electrode area of an initial storage electrode (also serving as a readout electrode) to increase a relative storage capacity. On the contrary, this embodiment can easily realize this.

The reason thereof will be described in detail with reference to FIGS. 4, 5 and 6. FIG. 4 shows a connection relationship of shift registers $S_2$ to $S_{11}$, electrodes $E_2$ to $E_{10}$ connected to the respective output stages, and supply lines 34, 35, 36 and 37 for delivering shift control pulses $\Phi_{1A}$, $\Phi_{2A}$, $\Phi_{1B}$ and $\Phi_{2B}$ for controlling respective output stages. FIG. 5 shows a potential distribution at respective times formed in the transfer channels below respective electrodes wherein the slanting line portions show signal charges as the liquid model. FIG. 6 shows a supply pulse timing from time $t_{10}$ to $t_{17}$. At time $t_{10}$, a control pulse $\Phi_{1B}$ is delivered to shift registers $S_2$, $S_6$ and $S_{10}$, resulting in the state of $B_{11}$ of FIG. 1(a). Namely, the shift stage $S_2$ is inverted to L level by signals of H and L levels of the transfer control pulse PI inputted from the input terminal 43. The shift stages $S_6$ and $S_{10}$ hold the previous state. At time $t_{B11}$, a potential distribution shown in FIG. 5 ($t_{B11}$) is formed. At time $t_{11}$, a control pulse $\Phi_{2B}$ is delivered to shift stages $S_3$, $S_7$ and $S_{11}$. Thus, the shift stage $S_3$ is inverted to H level, so the electrode $E_3$ is placed at H level. As a result, a portion of signal charge $Q_3$ moves to the portion below the electrode $E_3$. As shown in FIG. 5 ($t_{B12}$), the signal charges $Q_3$ are stored into the portions below three electrodes $E_3$, $E_4$ and $E_5$. It is at time $t_{13}$ that the signal charge $Q_3$ is stored into the portions below two electrodes $E_3$ and $E_4$. The potential distribution in this case is shown in FIG. 5 ($t_{B13}$).

When a control pulse $\Phi_{1B}$ is delivered to the shift stages $S_2$, $S_6$ and $S_{10}$ for a second time at time $t_{13}$, a change in the state of the shift stage $S_5$ is transmitted also to the shift state $S_6$. As a result, the states of the shift stages $S_2$ and $S_6$ are inverted. The potential distribution at time $t_{B14}$ is shown in FIG. 5 ($t_{B14}$). The signal charge $Q_3$ is stored into the portions below three electrodes, and a portion of signal charges $Q_4$ moves to the portion below the electrode $E_6$ and is stored into the portions below two electrodes.

When a control pulse $\Phi_{1A}$ is delivered at time $t_{14}$, the shift stage $S_4$ is inverted. At time $t_{15}$, signal charges $Q_3$ and $Q_4$ are both placed in two electrode storage state as shown in FIG. 5 ($t_{B15}$). When a control pulse $\Phi_{2A}$ is delivered at time $t_{15}$, the shift stage $S_1$ (not shown) and the shift stage $S_5$ are inverted. At time $B_{16}$, signal charges $Q_3$ and $Q_4$ are both placed in a three electrode storage state as shown in FIG. 5 ($t_{B16}$). At time $t_{B17}$, those charges are placed in two electrode storage state for a second time as shown in FIG. 5 ($t_{B17}$). By repeatedly carrying out such an operation, all charges are transferred. As stated above, since it can be completely prevented that charges of which transfer operation has been initiated are stored into only one electrode, there is no possibility that the maximum transfer charge quantity is prescribed by the area of only one area. Accordingly, when setting is made such that the lengths of electrodes $E_1$, $E_3$, $E_5$, $E_7$, $E_9$ and $E_{11}$ sharing an initial storage (readout storage) of signal charges are larger than those of electrodes except for the above, these electrode lengths prescribe the maximum transfer charge quantity. By setting these electrode lengths to a value as large (long) as a limited value of the processing technology, the maximum performance can be realized.

Figure 7:
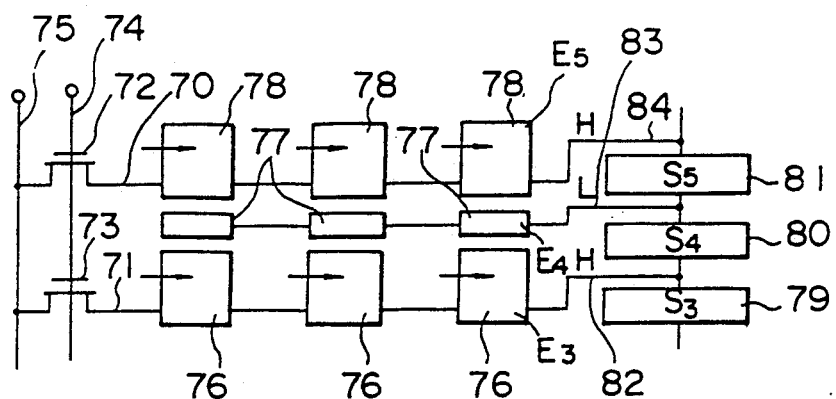
FIG. 7 is a block diagram showing the configuration of a circuit for delivering a readout pulse for reading out signal charges in the solid state image pickup device shown in FIG. 2.

FIG. 7 is a circuit diagram showing a shift register and circuit elements associated therewith in the case where the readout electrodes and the transfer electrodes are integrally formed. Reference numerals 76 and 78 represent readout/transfer electrodes having a relatively large area ($E_3$ and $E_5$ in this case), and reference numeral 77 denotes small area electrodes ($E_4$ in this case) except for small area electrodes. These electrodes are electrically coupled as plural sets thereof, respectively. Further, reference numerals 79, 80 and 81 represent shift stages ($S_3$, $S_4$, $S_5$) of a shift register, respectively. Their output terminals are connected to respective electrodes through wiring 82, 83 and 84. Reference numeral 75 denotes a readout signal supply line, reference numerals 72 and 73 switch circuits for selectively delivering readout signals to the electrodes 76 and 78 through wiring 71 and 70, respectively, and reference numeral 74 a switch control pulse supply line for controlling ON/OFF of the switch circuits 72 and 73. At the time of reading out signal charges, the electrodes $E_3$ (76) and $E_5$ (78) are set so that they are at H level. In this state, when the switch circuits 72 and 73 are turned ON, a readout signal 75 of H level is delivered to the electrodes 76 and 78. Thus, signal charges are read out from photosensitive elements (not shown) to respective electrodes. In this case, the readout signal 75 of H level is transmitted also to the output terminals of the shift stages 79 and 81. However, since these portions are set so that they are at H level, there is no possibility that the state of the shift register is inverted. Further, in the case where one electrode commonly performs such readout and transfer operations, it is preferable that H level, L level, and readout potential at the time of transfer is zero or a slight positive potential, a negative potential, and a positive high potential (e.g., 10 volts), respectively.

A second embodiment of a solid state image pickup device according to this invention is shown in FIG. 3. This embodiment differs from the above-described first embodiment in that there are provided electrodes 32 for an exclusive use in reading out signal charges from the photosensitive elements 40 to the respective charge transfer devices 31. Since each electrodes 32 is electrically independent of transfer electrodes $E_0$ to $E_{12}$, readout operation can be realized at an arbitrary timing without necessity of the above-described switch circuit, etc. The solid state image pickup device of the second embodiment can provide the same advantages with those of the solid state image pickup device of the first embodiment.

Figure 8:
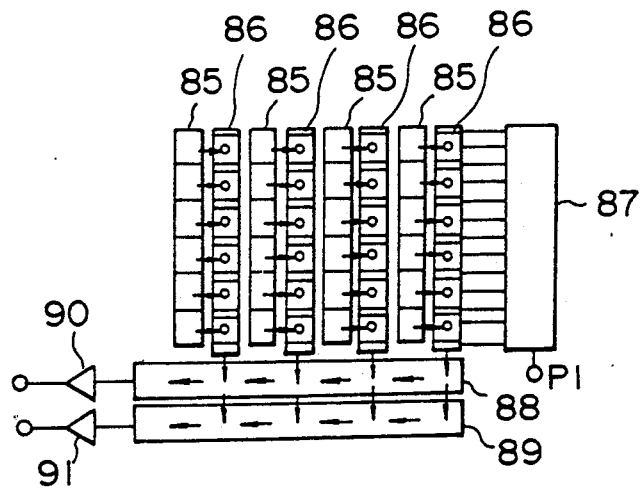
FIG. 8 is a plan view showing a third embodiment of a solid state image pickup device according to this invention.
Figure 9:
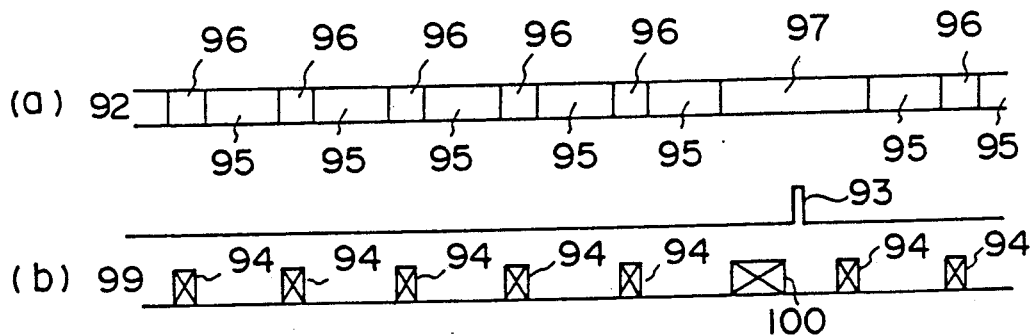
FIG. 9 is a diagram showing the operating sequence of the television system of the solid state image pickup device shown in FIG. 8.

A third embodiment of a solid state image pickup device according to this invention is shown in FIG. 8. In FIG. 8, reference numerals 85 represents a plurality of photosensitive element trains, respectively, reference numerals 86 vertical charge transfer devices, respectively, reference numeral 87 a register for controlling the transfer operation of each charge transfer device, reference numeral 88 a first horizontal charge transfer device, reference numeral 89 a second horizontal charge transfer device, reference numeral 90 a first output circuit, and reference numeral 91 a second output circuit. The operating sequence of the television system in this arrangement is shown in FIG. 9. In FIG. 9, reference numeral 92 represents an output signal time series, reference numerals 95 are intervals or time periods during which signals of two lines are outputted from the output circuits 90 and 91, respectively, reference numerals 96 horizontal blanking intervals, respectively, and a reference numeral 97 a vertical blanking interval. Reference numeral 93 represents a readout voltage pulse which is delivered for the vertical blanking interval 97. Reference numeral 99 represents a supply sequence of a shift register control pulse, reference numerals 94 intervals or time periods during which a train of pulses from time $t_0$ to time $t_{16}$ of FIG. 1(b) are applied, respectively, and reference numeral 100 an interval or time period for initializing respective vertical charge transfer device 86 prior to application of the readout voltage pulse 93. This initialization is realized by setting the transfer control pulse PI so that it is at L level to operate the shift register by the number of shift stages. All signal charges in the photosensitive elements are read into the vertical transfer devices 86 by the readout voltage pulse 93. Then, charges of two lines are transferred to the first and second horizontal transfer devices 88 and 89 for respective intervals 94 on the basis of the above-described principle of FIG. 1(a). By operating these horizontal transfer devices, outputs are provided for respective intervals 95. As stated above, by carrying out the operation of each vertical transfer device for the blanking interval, occurrence of pulsated noises jumping into an output signal can be completely eliminated. By carrying out this operation a predetermined times, all signal charges forming one frame can be entirely independently read out for a time period of one field (one field of the interlace).

Figure 10:
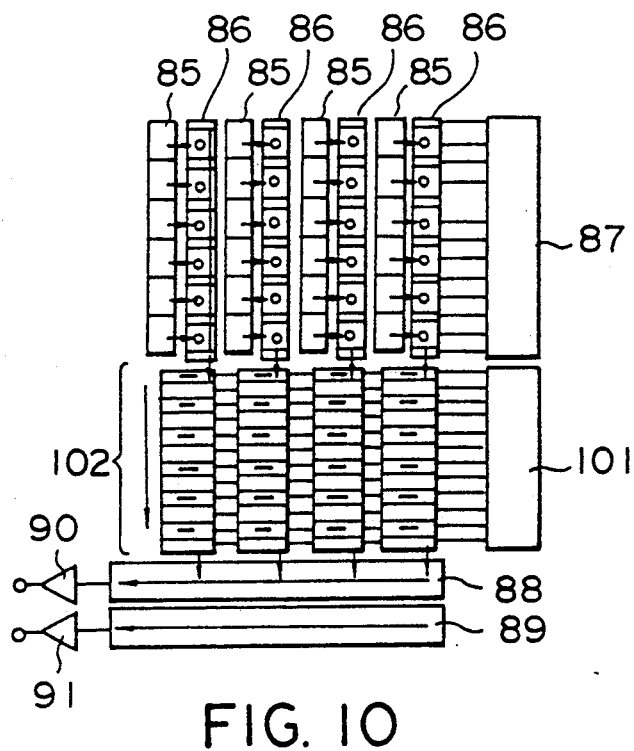
FIG. 10 is a plan view showing a fourth embodiment of a solid state image pickup device according to this invention.

A fourth embodiment of a solid state image pickup device according to this invention is shown in FIG. 10. This embodiment differs from the embodiment of FIG. 8 in that there is provided a storage transfer unit 102 between the vertical transfer devices 86 and the horizontal transfer devices 88 and 89. The storage transfer unit 102 is supplied with transfer pulses from the shift register 101 to transfer charges transferred from the vertical transfer devices 86 in a direction perpendicular to the plane of paper (in a vertical direction). The operation of the storage transfer unit 102 is carried out in accordance with the above-described four-phase drive to repeat the two electrode storage and the three electrode storage. In order that charges transferred are stored in succession from the lowermost row to one electrode, transfer control pulses inputted to the shift register 101 are set. Actually, for this purpose, a procedure may be taken to repeat the operation having the sequence from the time $t_0$ to the time $t_{16}$ as a unit to set an input voltage to the shift register 101 to represent L level at the time point when the leading charge has reached the portion below the final storage electrode of the storage transfer unit 102 to keep that input voltage at L level unit all charges are transferred to the storage transfer unit 102. The transfer from the shift register 101 to the horizontal transfer device is exactly the same as the transfer process of the vertical charge transfer device 86 of FIG. 8. It is desirable that the transfer from the vertical charge transfer devices 86 to the storage transfer unit 102 is carried out at a relatively high speed (high frequency) for a vertical blanking interval. It is to be noted that even if a conventional charge transfer device is used as the storage transfer unit 102, the effects and/or advantages with this invention using vertical charge transfer devices 86 cannot be impeded.

Figure 11:
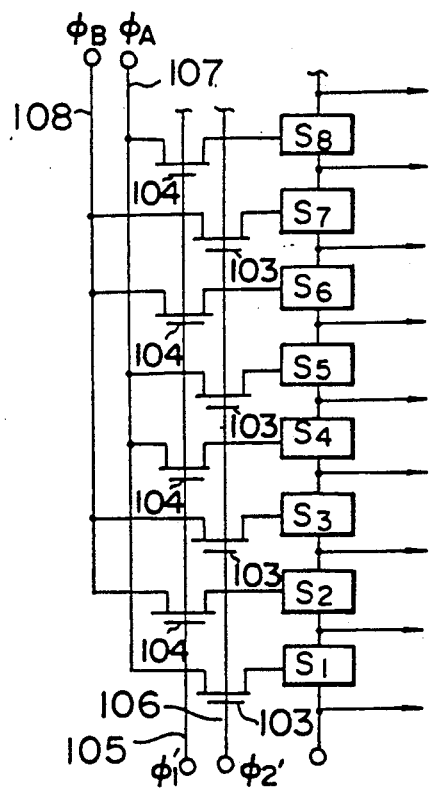
FIG. 11 is a schematic diagram showing an example of shift control pulse lines.
Figure 12:
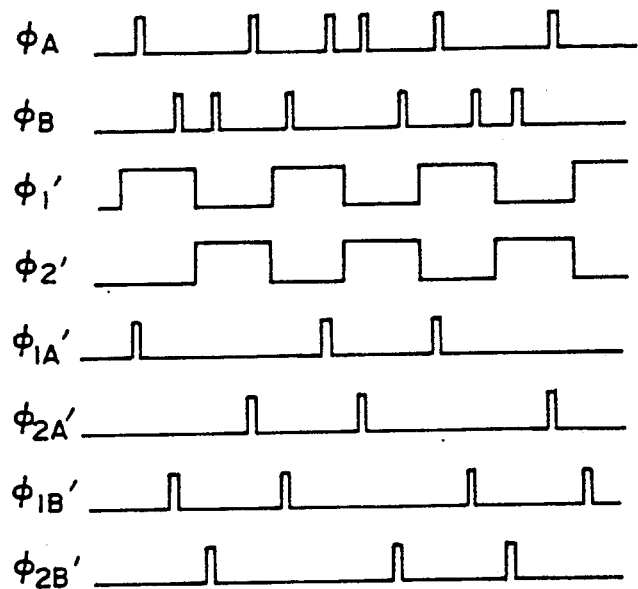
FIG. 12 is a timing chart showing control pulses delivered to respective supply lines.

It is to be noted that four kinds of shift register control pulses used in this invention must not be necessarily supplied from the external. An example of shift control pulse supply line is shown in FIG. 11. Reference symbols $S_1$ to $S_8$ represent respective shift stages of the shift register, reference numerals 103 and 104 switch circuits for controlling connection between supply lines 108 and 107 and respective shift stages for shift control pulses $\Phi_B$ and $\Phi_A$, and reference numerals 105 and 106 supply lines for two-phase pulses $\Phi_1'$ and $\Phi_2'$ for controlling the switch circuit, respectively. An example of control pulses delivered to respective supply lines is shown in FIG. 12. Reference symbol $\Phi_A$ represents a pulse delivered to the supply line 107, reference symbol $\Phi_B$ a pulse delivered to the supply line 108, reference symbol $\Phi_1'$ a pulse delivered to the supply line 105, and reference symbol $\Phi_2'$ a pulse delivered to the supply line 106. In response to supply of these pulses, pulses $\Phi_{1A}'$, $\Phi_{2A}'$, $\Phi_{1B}'$ and $\Phi_{2B}'$ similar to those in FIG. 1(b) are delivered to the shift stages $S_1$ to $S_8$. More particularly, the pulse $\Phi_{1A}'$ is delivered to the shift stages $S_4$ and $S_8$, the pulse $\Phi_{2A}'$ is delivered to the shift stages $S_1$ and $S_5$, the pulse $\Phi_{1B}'$ is delivered to the shift stages $S_2$ and $S_6$, and the pulse $\Phi_{2B}'$ is delivered to the shift stages $S_3$ and $S_7$;

It is to be noted that in the case where a buffer circuit is provided between the output circuit of the shift register or the output circuit and the transfer electrodes, the same advantages as those with this invention can be provided by allowing the fall time with respect to the rise time of the output circuit to be sufficiently large. An example for realizing this is shown as follows.

Figure 13:
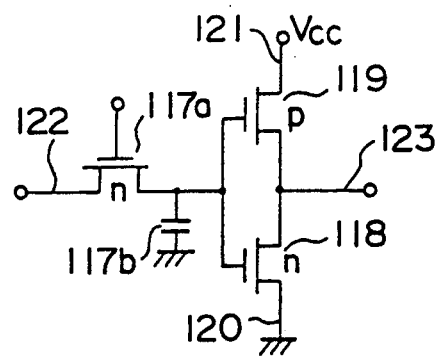
FIG. 13 is a circuit diagram showing respective shift stages of a shift register.

FIG. 13 is a typical circuit diagram showing one shift stage of the shift register circuit. Reference numerals 117a and 117b represent n-channel type sample hold elements, respectively, and reference numerals 118 and 119 an n-channel type MOS transistor and a p-channel type MOS transistor, respectively, which constitutes a well known CMOS inverter circuit. A voltage of H level is delivered to the node 121, and a voltage of L level is delivered to the node 120. A voltage of H level is inputted to the input terminal 122. When the transistor 117a is turned ON, a voltage of H level is delivered to the gates of the transistors 118 and 119. As a result, the transistor 118 becomes conductive and the transistor 119 becomes non-conductive. Accordingly, the output terminal 123 is placed at L level. In contrast, when a voltage of L level is inputted to the input terminal 122, the transistor 117a is turned ON. As a result, the transistor 118 becomes non-conductive, and the transistor 119 becomes conductive. Accordingly, the output terminal 123 is placed at H level. The fall from H level to L level is determined by the operating speed of the n-channel transistor 118, and the rise from L level to H level is determined by the operating speed of the p-channel transistor 119. On the other hand, as well known, the positive hole mobility of the p-channel transistor is about one third of the electron mobility of the n-channel transistor. Accordingly, the operating speed also becomes equal to about one third. Namely, in order to realize this invention by an ordinary two-phase shift control, it is necessary to set the channel width/the channel length (W/L) of the p-channel transistor to be at least three times or more than that of the n-channel transistor.

Figure 14:
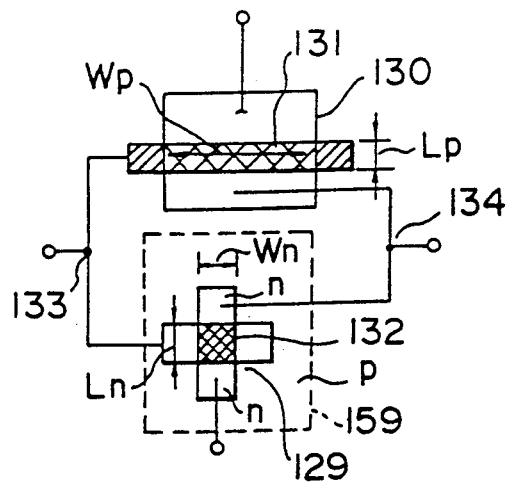
FIG. 14 is a plan view showing a CMOS inverter circuit.
Figure 15:
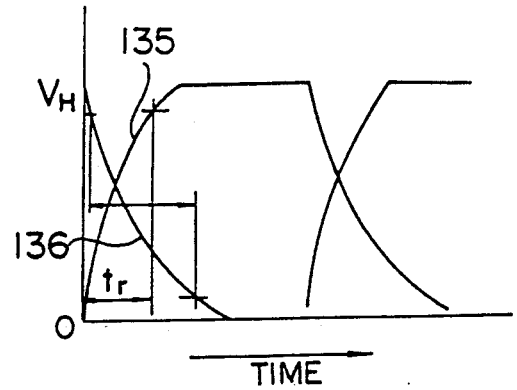
FIG. 15 is a graph showing output waveforms of the CMOS inverter circuit shown in FIG. 14.
Figure 16:
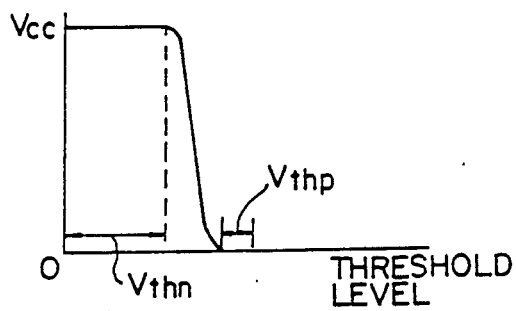
FIG. 16 is a graph showing an input/output characteristic of a CMOS inverter circuit.
Figure 23:
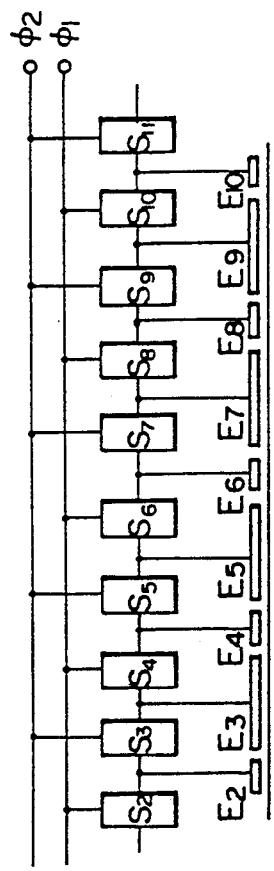
FIG. 23 is a schematic diagram showing an arrangement of the solid state image pickup device shown in FIG. 20.
Figure 24:
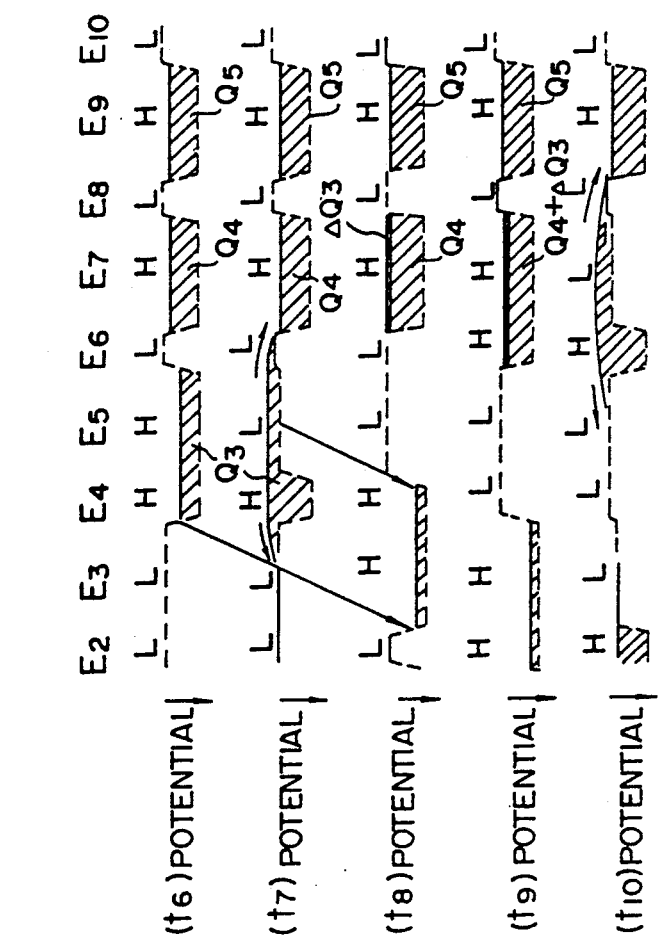
FIG. 24 is an explanatory view showing a charge transfer process of the charge transfer device shown in FIG. 23.

FIG. 14 is a plan view showing a CMOS inverter circuit. Reference numeral 129 represents an n-channel MOS transistor formed within a p-well 159 wherein the mesh slanting line portion 132 represents a channel region, Ln a channel length, and Wn a channel width. Reference numeral 130 represents a p-channel MOS transistor formed on an n-type substrate wherein the mesh slanting line portion 131 represents a channel region, Wp a channel width, and Lp a channel length. Reference numerals 133 and 134 represent an input terminal and an output terminal of the inverter gate, respectively. In this case, since Wp/Lp is set so that it is about six times than Wn/Ln, the operating speed of the transistor 130 become equal to a value about two times larger than the operating speed of the transistor 129. Thus, an output waveform shown in FIG. 15 is provided. In FIG. 15, reference numeral 135 represents a rise waveform from L level to H level, reference numeral 136 represents a fall waveform from H level to L level, $t_r$ a rise time, and $t_f$ a fall time. As seen from this figure, the relationship expressed as $t_r$, $t_f$ is sufficiently satisfied. Thus, there is no possibility that at least maximum transfer charge quantity is prescribed only by one electrode like a signal charge $Q_3$ shown in FIG. 23 ($t_7$). An input/output characteristic of a CMOS inverter is shown in FIG. 16. As shown in FIG. 16, the threshold voltage Vthn of the n-channel type MOS transistor is set to a value sufficiently larger than the threshold voltage Vthp of the p-channel type MOS transistor. Accordingly, the time when the n-channel type MOS transistor starts to rise can be sufficiently delayed with respect to the time when the p-channel type MOS transistor starts to rise. Thus, the intention of this invention can be realized.

Figure 17:
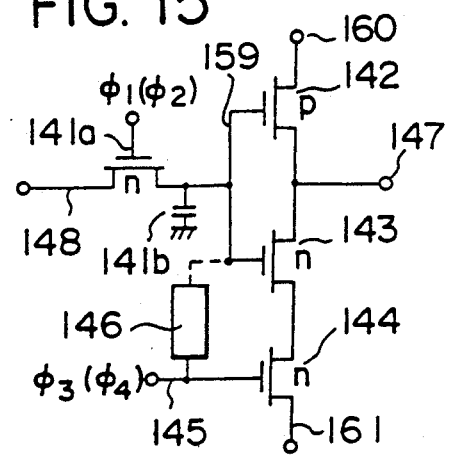
FIG. 17 is a circuit diagram showing respective stages of a shift register.

An example for realizing a unit shift stage of the shift register according to this invention by a circuit configuration is shown in FIG. 17. Reference numeral 148 represents an input terminal, reference numerals 141a and 141b an n-channel MOS transistor and a capacitor constituting a sample hold circuit, respectively, and reference numeral 159 an input wiring for a CMOS inverter. Reference numerals 142 and 143 represent a p-channel type MOS transistor and an n-channel type MOS transistor constituting the CMOS inverter, respectively. The transistor 143 is connected to a L level voltage supply line 161 through an n-channel type MOS transistor 144. The conductive state of the transistor 144 is controlled by another input line 145.

Figure 18:
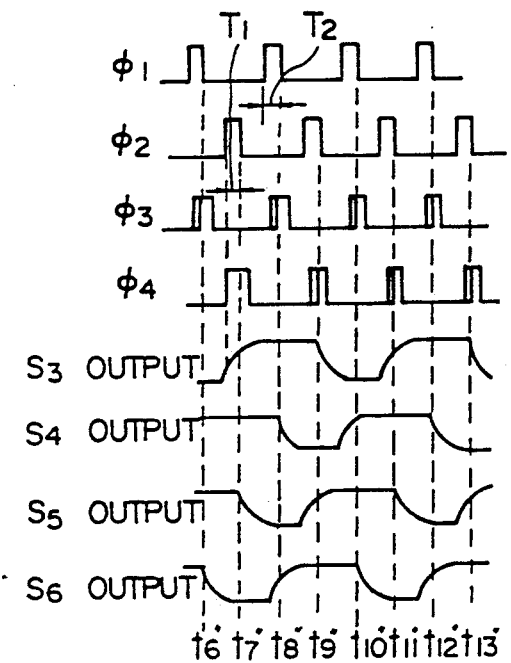
FIG. 18 is a time chart showing transfer pulses applied to the shift stages shown in FIG. 17 and output waveforms of respective shift stages.
Figure 19:
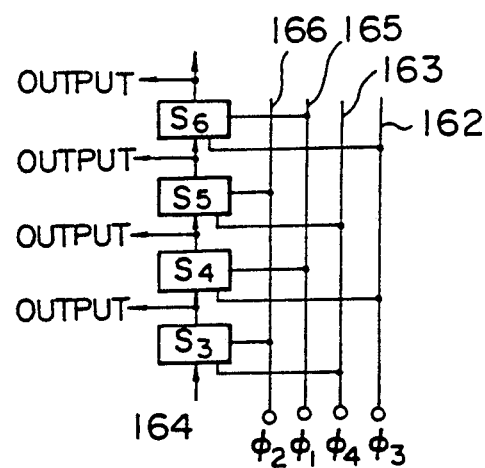
FIG. 19 is a block diagram showing a shift register constituted by the shift stages shown in FIG. 17.
Figure 20:
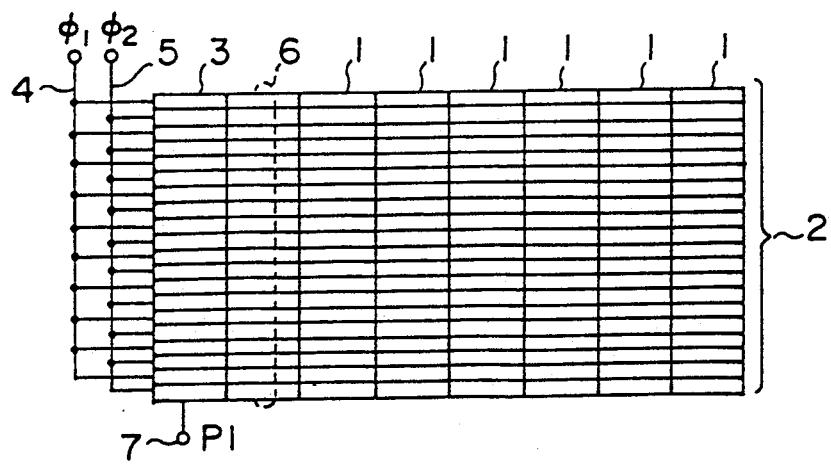
FIG. 20 is a plan view showing an arrangement of a conventional accordion type solid state image pickup device.
Figure 21:
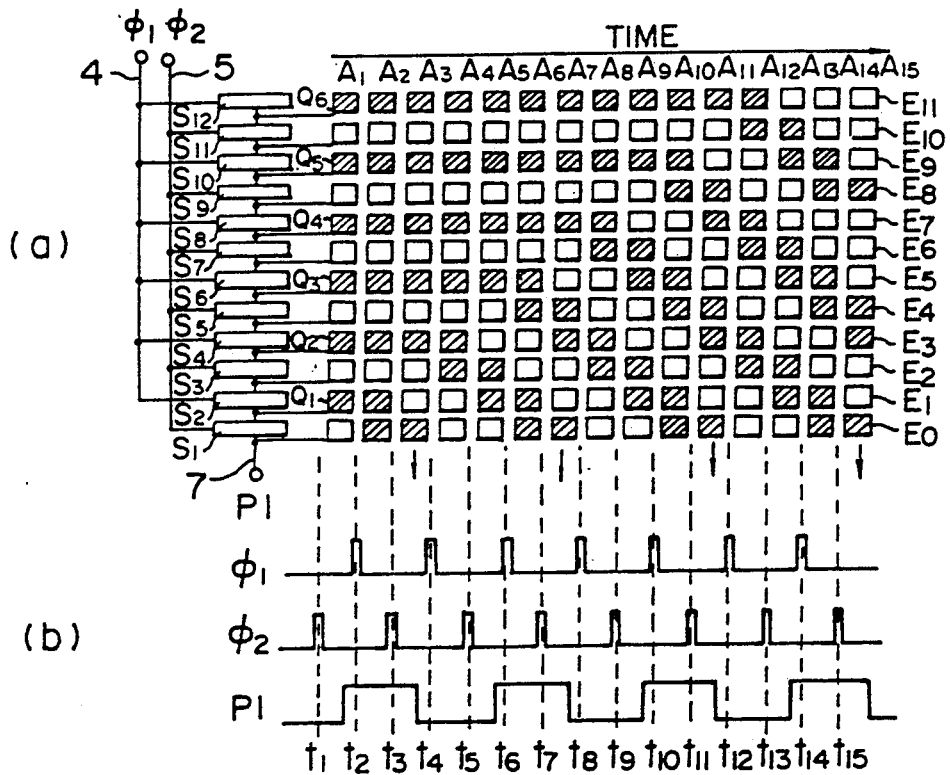
FIG. 21 is a view showing the principle of the operation of the conventional solid state image pickup device shown in FIG. 20.
Figure 22:
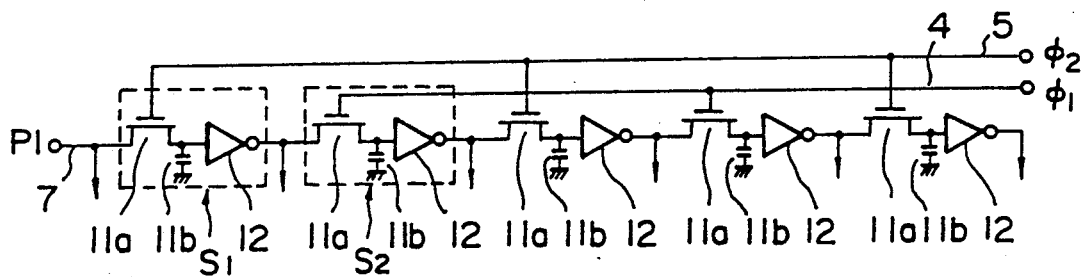
FIG. 22 is a circuit diagram showing a shift register used in the conventional solid state image pickup device shown in FIG. 20.
Figure 25:
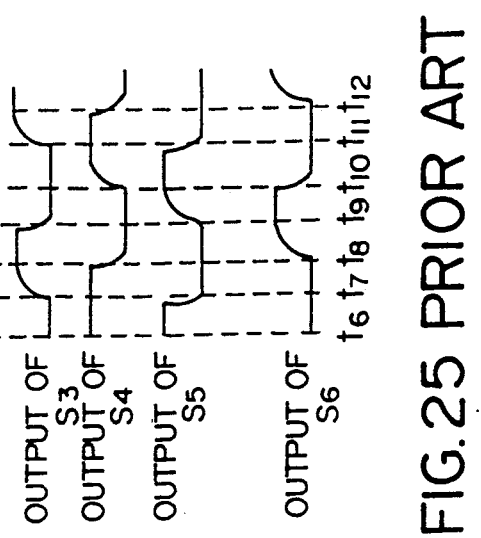
FIG. 25 is a timing chart showing transfer pulses applied to the charge transfer device shown in FIG. 23.

The operation of the above-described shift register will be described with reference to FIGS. 18 and 19. An example of control pulses inputted to the transistor 141a and the input line 145 is shown in FIG. 18. FIG. 19 shows a shift register comprised of shift register unit shift circuits of this invention shown in FIG. 17. In FIG. 19, reference symbols $S_3$ to $S_6$ represent shift stages, respectively, reference numerals 165, 166, 162 and 163 supply lines for the pulses $\Phi_1$, $\Phi_2$, $\Phi_3$ and $\Phi_4$ shown in FIG. 18, respectively. The pulses $\Phi_1$ and $\Phi_2$ are inputted to the transistor 141a as a control pulse of the sample hold circuit, and the pulses $\Phi_3$ and $\Phi_4$ are delivered to the input line 145. Let suppose the case where, e.g., the output of the shift stage $S_3$ is at L level, the outputs of the shift stages $S_4$ and $S_5$ are at H level, and the output of the shift stage $S_6$ is at L level. When a signal of L level is inputted to the input line 164 of the shift stage $S_3$ and the pulse $\Phi_1$ is delivered, transistors 141a of the shift stages $S_3$ and $S_5$ become conductive. As a result, the inverter input 159 of the shift stage $S_3$ shifts to L level, so the transistor 142 is turned ON. Thus, a voltage of H level delivered from the supply line 160 is transmitted to the output terminal 147. On the other hand, the inverter input of the shift stage $S_5$ shifts to H level. As a result, the transistor 142 is turned OFF and the transistor 143 is turned ON. However, this transistor 143 does not conductive with the L level supply line 161 as long as the transistor 144 is turned ON. At times $t_7''$ and $t_{11}''$ of FIG. 18, the pulse $\Phi_4$ is delivered to the input line 145, so the transistor 144 is turned ON. As a result, the output terminal 147 and the L level supply line 161 become conductive. Thus, the output terminal 147 of the shift stage $S_5$ is placed at L level. An operation similar to the above will be conducted also for the shift stages $S_4$ and $S_6$ to which pulse $\Phi_1$ and $\Phi_3$ are delivered. Namely, the time when the potential level of the output terminal 147 is inverted from H level to L level with respect to the time when that potential level is inverted from L level to H level will be delayed by a difference $T_1$ ($T_2$) between a rise time of the pulse $\Phi_2$ ($\Phi_1$) and that of the pulse $\Phi_4$ ($\Phi_3$).

Accordingly, by controlling this time difference, the fall of the output can be delayed by a predetermined time. Thus, this invention can be realized. Output waveforms of respective output stages are shown in FIG. 18. These outputs serve as transfer pulses delivered to the transfer electrodes. As shown at times $t_6''$ and $t_{13}''$, three pulses are kept substantially at H level at the time when inversion from H level to L level is initiated with respect to all the output pulses. It is apparent that this invention may be realized by an approach in which a delay circuit 146 shown in FIG. 17 is inserted to delay a pulse inputted to the transistor 143 by a predetermined time to input such a delayed pulse to the transistor 144. In this case, pulses $\Phi_3$ and $\Phi_4$ of FIG. 18 entirely become unnecessary.

In accordance with this invention, storage of charges into the electrode and readout of charges therefrom can be formed using a two transfer electrode as a unit. Further, the electrode area used for storing charges is enlarged to thereby increase its storage capacity. Thus, charges can be transferred without reducing the maximum charge transfer capacity. As a result, the degree of integration of elements can be improved and the maximum dynamic range (maximum signal charge quantity) can be provided. Furthermore, the restriction of pulse timings in transfer can be relaxed to a great extent. It is to be noted that this invention is not limited to the implementation of two electrodes per each photosensitive element. In the case of carrying out the interlace operation known as the television system, an arrangement of two electrodes by two photosensitive elements may be realized and other various arrangements may be adopted. In addition, it is needless to say that the technology of this invention is not necessarily limited to a solid state image pickup device, but may be applied to charge transfer type memory devices.

What is claimed is:

1. A charge transfer device comprising,
a shift register comprised of a plurality of shift stages directly connected to each other, phase pulses for a multi-phase control pulse being delivered to said shift stages, respectively, a transfer control pulse being delivered to said shift register stage arranged at one end of said plurality of shift stages, and a transfer unit having a plurality of transfer electrodes provided in correspondence with said shift stages of said shift register, transfer pulses being delivered from said shift stages of said shift register to said transfer electrodes, respectively, so as to apply transfer pulses in a predetermined order from said shift stages of said shift register to said transfer electrodes of said transfer unit, respectively, to thereby sequentially transfer signal charges stored below said transfer electrodes in a predetermined direction,
characterized in that:
said transfer electrodes are such that transfer electrodes having a larger width in the predetermined direction and transfer electrodes having a smaller width in the predetermined direction are arranged one after another, and that they are connected to said respective stages of said shift register in order, each of said transfer electrodes in alternating arrays, being given a transfer pulse from each of the shift stages of said shift register so that an electrode to the rear of the transfer direction becomes an L-level in potential after an electrode to the front of the transfer direction has become an H-level in potential, and the area of said transfer electrode having a larger width being sufficiently large so that it can store a sufficiently large charge with respect to a transfer electrode having a smaller width.

2. The charge transfer device of claim 1, wherein:
said shift register is driven by at least four control pulses having different phases, respectively.

3. A solid state image pickup device comprising,
a photoelectric conversion unit comprised of a plurality of photosensitive elements to convert an optical input to signal charges, a transfer unit having a plurality of transfer electrodes, said transfer electrodes being connected to said respective photosensitive elements in said photoelectric conversion unit in order to store signal charges from said respective photosensitive elements to transfer storage charges when transfer pulses are applied thereto, and a shift register comprised of shift stages directly connected to each other of which number corresponds to that of said transfer electrodes of the transfer unit, phase pulses for a multi-phase control pulse being delivered to said shift stages, respectively, a transfer control pulse being delivered to said shift register stage arranged at one end of said plural shift stages, said transfer pulses being delivered to said transfer electrodes, respectively, characterized in that:
transfer electrodes having a larger width in the transfer direction and transfer electrodes having a smaller width in the transfer direction are arranged one after another;
each of said transfer electrodes in alternating arrays, being given a transfer pulse from each of the shift stages of said shift register so that an electrode to the rear of the transfer direction an L-level in potential after an electrode to the front of the transfer direction has become an H-level in potential, and the area of said transfer electrode having a larger width being sufficiently large so that it can store a sufficiently large charge with respect to a transfer electrode having a smaller width.

4. The solid state image pickup device of claim 3, wherein:
said shift register is driven by at least four control pulses having different phases, respectively.

5. The solid state image pickup device of claim 3, wherein:
each of said shift stages of said shift register comprises a sample-hold circuit and an inverter circuit that inverts the output of said sample-hold circuit, with four continuous shift stages being controlled by signals transmission with respectively different control pulses.

6. The solid state image pickup device of claim 5, comprising:
read electrode to read a signal charge from said photosensitive element, and
signal supply means provided individually to said shift registers, and supplying read control signals to read signal charges at a read cycle.

7. The solid state image pickup device of claim 6, comprising:
switch circuits that electrically connect said signal supply means and said transfer electrode during a read cycle, and separate said signal supply means and said transfer electrode during other cycles.

8. The solid state image pickup device of claim 3, wherein:
each of said shift stages of said shift register, comprises a sample-hold circuit and an inverter circuit that inverts the output of said sample-hold circuit, and
said inverter circuit has the circuit coefficient set so that its rise time is sufficiently shorter than its fall time.

9. The solid state image device of claim 8, wherein:
each of said shift stages of said shift register comprises a gate circuit that controls at least a first time for a rise and a fall of said inverter circuit.

10. The solid stage image pickup device of claim 3, wherein:

a transfer electrode, comprising a transfer electrode having a large surface area and a transfer electrode having a small electrodes area, is configured so that the transfer electrode having a smaller width is set to a low potential while the transfer electrode having a larger width is at a high potential.

11. A solid state image pickup device of claim 3, wherein a readout control electrode is provided between said photosensitive elements in said photoelectric conversion unit and said transfer electrodes in said transfer unit.

12. A solid state image pickup device of claim 3, wherein:

there are provided plural sets of photoelectric conversion units and transfer units as said photoelectric conversion unit and said transfer unit, respectively, said solid state image pickup device further comprising, a plurality of transfer devices for deriving outputs respectively from said transfer units and taking them out from said transfer units.

13. A solid state image pickup device as set forth in claim 12, wherein:

there is provided a storage transfer unit between said transfer units and said transfer devices.

14. The solid state image pickup device of claim 3, comprising:

read electrode to read a signal charge from said photosensitive element, and signal supply means provided individually to said shift registers, and supplying read control signals to read signal charges at a read cycle.

15. The solid state image pickup device of claim 14, comprising:

switch circuits that electrically connect said signal supply means and said transfer electrode during a read cycle, and separate said signal supply means and said transfer electrode during other cycles.

* * * * *